Patented Jan. 13, 1953

2,625,515

UNITED STATES PATENT OFFICE 2,625,515

CLEANING COMPOSITION

George G. Wittwer, Chappaqua, N. Y., assignor to W-B Chemical Company, Inc., Mount Vernon, N. Y., a corporation of New York No Drawing. Application January 17, 1948, Serial No. 2,959

5 Claims. (Cl. 252—137)

This invention relates to cleaners for fabrics, rugs and the like.

There has been on the market for some time a fabric cleaner, sometimes known as a shampoo, for cleaning rugs, upholstery, etc. This product is normally marketed in the form of a gel. In use, a prescribed amount of the gel is dissolved in water, and the resulting liquid is applied to the surfaces to be cleaned. The product referred to is a so-called soapless shampoo and its basic constituent is sodium oleyl methyl tauride. The present invention is directed toward an improvement in the cleaner referred to, along two lines: its physical appearance, and its detergent properties.

The gel, as heretofore marketed, has a somewhat cloudy or murky appearance, sometimes to such an extent that it is not even translucent. It is believed that this cloudiness is caused by colloidal suspensions, insoluble in the water content of the gel, which result from minute quantities of unreacted materials in the sodium oleyl methyl tauride. While the cloudiness of the gel has no known adverse effect on the cleansing properties, it causes a certain amount of consumer resistance, particularly when, as is the normal practice, the gel is packaged in glass jars.

While the gel in question is considered generally satisfactory as a cleaner, it has been found that it sometimes may fall short of a desired optimum as respects general detergency and greasy surfaces.

It is an object of the present invention to provide a cleaning material for rugs, fabrics, and the like, such that it can be packaged in the form of a gel, and such that the gel is clear and briliant in appearance.

It is a further object of the invention to provide a method of producing a cleaning gel of the type referred to, such that a clear and brilliant gel is attained without materially affecting the other desirable characteristics of the product, or interfering with proper conditions of production.

Still a further object of the invention is to provide a cleansing gel of the type referred to, with improved detergent properties, particularly as to greasy surfaces and objects.

Further objects and advantages of the invention will be apparent from the ensuing description.

According to the invention in its entirety I bring together under suitable conditions, and in suitable proportions, sodium oleyl methyl tauride, a suitable grease solvent, an alkaline material to raise the pH to give improved detergency and to serve as a clarifying and thickening agent and an agent to control the viscosity.

As a source of sodium oleyl methyl tauride I find it convenient to use a commercially available product which contains such tauride. While this product may vary somewhat in its composition as it is received from the manufacturer, the following is a characteristic formula of its make up:

| | Per cent |
|---|---|
| Sodium oleyl methyl tauride | 16 |
| Sodium chloride | 4.5–6.5 |
| Soap (insoluble) | .5 |
| Boric acid (preservative) | 1.0 |
| Water | 76 |

This product is a cloudy, thick, amber-colored neutral gel having good detergent properties. It is herein referred to, for convenience of description as the raw gel.

While the amount of sodium oleyl methyl tauride used may vary, I have found that satisfactory results are obtained with a proportion of from about 3.7% to about 13.2%. When the raw gel mentioned is used as a source of sodium oleyl methyl tauride, a proportion of the raw gel is taken that will give the desired proportion of tauride.

The grease solvent used for improving the detergent properties as respects greasy surfaces should be of such a nature that it will not adversely affect the physical appearance of the finished gel; i. e., will not interfere with the production of a stable clarity and brilliancy. Most materials which dissolve grease are of a type which would cause cloudiness when added to a water soluble material. For this purpose benzyl alcohol or 2-o-toloxy ethanol give satisfactory results.

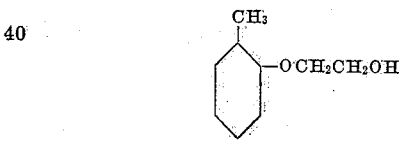

While either of these latter agents could be used, I find it cheap and convenient to use a commercial detergent product which contains both. This product has a composition substantially as follows:

| | Per cent |
|---|---|
| Concentrated (76%) sodium oleyl methyl tauride | 44–46 |
| 2-o-toloxy ethanol | 23–31 |
| Benzyl alcohol | 24–33 |

While the amount of added detergent may vary, ranges substantially as follows have been found to give a satisfactory product: 2-o-toloxy ethanol 0.31% to 1.36%; benzyl alcohol 0.32% to 1.45%. If these limits are exceeded, the viscosity of the final product will be reduced to below the desired limits. If quantities below these limits are used, unsatisfactory detergency will result. These ranges are predicated on the conjoint use of the two grease solvents. If either is used alone, the proportion can be increased as may be indicated. I have found, however, that their conjoint use results in a marked improvement in the detergent properties of the finished product, and the presence of both in the commercial product mentioned makes the latter a convenient source as a starting material. When such commercial product is used, a proportion of the same is taken that will give the desired proportions of cresyl glycol and benzyl alcohol. For the purpose in view, the presence of concentrated sodium oleyl methyl tauride in such source material is incidental. It will be apparent, however, that due regard should be paid to it in arriving at the amounts used in the formulation.

Various materials may be used as agents to raise the pH, clarify the raw gel and thicken the final product. These materials eliminate the cloudiness in the finished gel presumably by solubilizing the water insoluble colloids. However, other factors are involved. The end product should have a pH under 10 to avoid injury to fabrics and hands. If desired, the pH can be lowered to slightly below neutrality, pH of 6, but this would lower somewhat the detergent properties imparted by alkalies giving pH values up to 10. While a number of materials will solubilize the suspended colloids, most of them are impractical because they produce pH values greater than 10 which are harmful and this high alkalinity cannot be reduced without again causing cloudiness. Thus these solubilizers defeat the very object of their use. I have discovered that tetrapotassium pyrophosphate gives highly satisfactory results. Its use results in a clear, brilliant, transparent gel and has other advantages later described. While the proportion of tetrapotassium pyrophosphate may vary, I have found that a satisfactory range is around 3–14%.

In carrying out the invention according to what is now considered the best advantage, I control the viscosity of the end product by the suitable thickening and thinning materials, first attaining a viscosity higher than that ultimately desired, and then thinning to the preferred viscosity. An added advantage of the use of tetrapotassium pyrophosphate as a clarifier is that it also serves as a means of thickening the mixture. Up to a certain point, the more phosphate used, the thicker the gel. When the maximum limit of 14% is reached, more phosphate causes a thinning and an ultimate separation. If further thickening is desired after the maximum limit of tetrapotassium pyrophosphate has been reached, added water will cause thickening. For the final thinning I obtain satisfactory results by using "Butyl carbitol" (diethylene glycol mono butyl ether) in the amount of about 0.1–1.36%. The use of this material has an added advantage that it serves to hasten the solubility of the product when the latter is mixed with water for use as a cleaner.

Hence I find it desirable to overthicken the product with the phosphate and then add "butyl carbitol" in sufficient amount as stated above to obtain the desired viscosity. A suitable viscosity for the final product is between 1600 and 4500 centipoises at 118° F., as indicated by a Brookfield synchro-electric viscosimeter.

The following more detailed procedure is cited by way of example. The amounts of starting materials are for a batch of 100 pounds.

Charge a kettle, preferably stainless steel or nickel clad, with 50.7 pounds of the raw gel above described.

Add 44.1 pounds hot water and heat the mixture to say 115–140° F. while stirring.

Add 1.35 pounds of the commercial product containing concentrated sodium oleyl methyl tauride, 2-o-toloxy ethanol and benzyl alcohol. Stir until the mass is homogeneous.

Add 3.85 pounds of tetrapotassium pyrophosphate and mix thoroughly. Test the viscosity by means of the before mentioned viscosimeter and adjust the viscosity as desired, adding additional amounts of tetrapotassium pyrophosphate to thicken and adding "butyl carbitol" to thin the mixture.

It is to be understood that the raw materials, as received from the manufacturer, may vary somewhat as to viscosity and the amount of unreacted materials. If so, the amounts of starting materials may be adjusted to suit.

The finished product is a clear, brilliant, substantially transparent gel, having good detergent properties, both as to ordinary dirt and as to greasy surfaces.

In use, a prescribed amount of the gel is dissolved in water and the solution rubbed on the surface to be cleaned.

I claim:

1. An aqueous detergent gel comprising in the proportions by weight: sodium oleyl methyl tauride about 3.7 to 13.2%, tetrapotassium pyrophosphate 3 to 14%, a grease solvent selected from the group consisting of 2-o-toloxyethanol about 0.31 to 1.36% and benzyl alcohol 0.32 to 1.45% and mixtures thereof, and diethylene glycol mono butyl ether about 0.1 to 1.35%, the remainder being substantially water, said gel having a viscosity of from 1600 to 4500 centipoises at 118° F.

2. An aqueous detergent gel comprising in the proportions by weight: sodium oleyl methyl tauride about 3.7 to 13.2%, tetra potassium pyrophosphate 3 to 14%, 2-o-toloxy ethanol 0.31 to 1.35%, benzyl alcohol 0.32 to 1.45%, and diethylene glycol mono butyl ether 0.1 to 1.36%, the remainder being substantially water, said gel having a viscosity of from 1600 to 4500 centipoises at 118° F.

3. An aqueous detergent gel comprising in the proportions by weight: sodium oleyl methyl tauride about 3.7 to 13.2%, tetra potassium pyrophosphate 3 to 14%, 2-o-toloxyethanol 0.31 to 1.36%, and diethylene glycol mono butyl ether 0.1 to 1.36%, the remainder being substantially water, said gel having a viscosity of from 1600 to 4500 centipoises at 118° F.

4. An aqueous detergent gel comprising in the proportions by weight: sodium oleyl methyl tauride about 3.7 to 13.2%, tetra potassium pyrophosphate 3 to 14%, benzyl alcohol 0.32 to 1.45% and diethylene glycol mono butyl ether 0.1 to 1.36%, the remainder being substantially water, said gel having a viscosity of from 1600 to 4500 centipoises at 118° F.

5. An aqueous detergent gel containing in the proportions by weight: about 8.7% of sodium oleyl methyl tauride, about 3.85% of tetra potassium pyrophosphate, 0.31 to 0.42% of 2-o-tol-oxyethanol, 0.32 to 0.45% of benzyl alcohol, 2.28 to 3.30% sodium chloride, 0.25% soap, 0.5% boric acid, 82.6% water, and 0.1 to 1.36% diethylene glycol mono butyl ether, said gel having a viscosity of from 1600 to 4500 centipoises at 118° F.

GEORGE G. WITTWER.

REFERENCES CITED

The following references are of record in the file of this patent:

UNITED STATES PATENTS

| Number | Name | Date |
|---|---|---|
| 2,125,411 | Wilson | Aug. 2, 1938 |
| 2,134,346 | Siefert | Oct. 25, 1938 |
| 2,159,381 | Jochum et al. | May 23, 1939 |
| 2,437,253 | Henderson | Mar. 9, 1948 |
| 2,500,024 | Cornell et al. | Mar. 7, 1950 |
| 2,542,385 | Ayo et al. | Feb. 20, 1951 |

OTHER REFERENCES

Jour. Ind. & Eng. Chem., Jan. 1934, pgs. 24–26, Duncan, "The New Detergents."

Soap, Jan. 1939, pgs. 24–26 and 69.

Industrial Solvents, Mellan. Reinhold Pub. Co., N. Y., 1939, pg. 246.

Synthetic Organic Chemicals, Carbide & Carbon Chem. Corp., N. Y., 1942, pg. 28.